United States Patent
Rao et al.

(10) Patent No.: US 7,836,020 B1
(45) Date of Patent: Nov. 16, 2010

(54) METHOD AND APPARATUS TO IMPROVE SERVER PERFORMANCE ASSOCIATED WITH TAKEOVER AND GIVEBACK PROCEDURES

(75) Inventors: Sriram S. Rao, San Jose, CA (US); Joydeep Sen Sarma, Sunnyvale, CA (US); Alan L. Rowe, San Jose, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 477 days.

(21) Appl. No.: 11/397,466

(22) Filed: Apr. 3, 2006

(51) Int. Cl.
*G06F 7/00* (2006.01)
*G06F 17/00* (2006.01)
(52) U.S. Cl. .................... 707/649; 707/685
(58) Field of Classification Search ............... 707/624, 707/649, 685
See application file for complete search history.

(56) References Cited

U.S. PATENT DOCUMENTS

| | | | |
|---|---|---|---|
| 5,724,501 A * | 3/1998 | Dewey et al. ............... 714/9 |
| 5,819,292 A * | 10/1998 | Hitz et al. ................... 707/203 |
| 6,023,706 A * | 2/2000 | Schmuck et al. ............ 707/200 |
| 6,571,259 B1 * | 5/2003 | Zheng et al. ................ 707/205 |
| 6,604,118 B2 * | 8/2003 | Kleiman et al. ............. 707/203 |
| 6,757,695 B1 * | 6/2004 | Noveck et al. .............. 707/200 |
| 6,865,157 B1 * | 3/2005 | Scott et al. .................. 370/242 |
| 6,920,579 B1 * | 7/2005 | Cramer et al. ................ 714/4 |
| 6,965,989 B1 * | 11/2005 | Strange et al. ................ 713/1 |
| 7,039,828 B1 * | 5/2006 | Scott ............................ 714/4 |
| 2004/0117580 A1 * | 6/2004 | Wu et al. ..................... 711/170 |
| 2005/0015460 A1 * | 1/2005 | Gole et al. .................. 709/213 |
| 2006/0253575 A1 * | 11/2006 | Carter et al. ................ 709/224 |

* cited by examiner

*Primary Examiner*—Kuen S Lu
*Assistant Examiner*—Hexing Liu
(74) *Attorney, Agent, or Firm*—Blakely, Sokoloff, Taylor & Zafman LLP (57) ABSTRACT

A system is provided to improve storage server performance. The system comprises a receiving component of a storage server to receive a partner server's file system metadata while the partner server operates in a normal mode. The partner server's file system metadata is stored in the storage servers metadata cache and is used to mount the partner server's file system when the first server transitions into a takeover mode of operation.

19 Claims, 5 Drawing Sheets

METHOD AND APPARATUS TO IMPROVE SERVER PERFORMANCE ASSOCIATED WITH TAKEOVER AND GIVEBACK PROCEDURES

FIELD OF THE INVENTION

At least one embodiment of the present invention pertains to remote management of a processing system and more particularly, to a method and apparatus to improve server performance associated with takeover and giveback procedures.

BACKGROUND

A networked storage system may include one or more storage servers, which may be storage appliances. A storage server may provide services related to the organization of data on mass storage devices, such as disks. Some of these storage servers are commonly referred to as filers or file servers. An example of such a storage server is any of the Filer products made by Network Appliance, Inc. in Sunnyvale, Calif. The storage appliance may be implemented with a special-purpose computer or a general-purpose computer. Depending on the application, various networked storage systems may include different numbers of storage servers.

In some existing systems, in order to provide higher availability of storage server services, two storage servers may be utilized to operate as a clustered storage server system. Specifically, each storage server in a clustered storage server system (sometimes referred to as nodes or cluster partners) can take over another storage server in the event of a failover situation. The mode of operation where requests directed to one cluster partner are serviced by the other cluster partner when the other cluster partner is in a failure state or off line is referred to as a takeover mode. In the takeover mode, input/output (I/O) traffic can continue as if the off-line partner storage server still exists and functions normally. In order to start operating in the takeover mode, the storage server has to mount the volumes of its partner storage server. A volume is a logical data set, which is an abstraction of physical storage, combining one or more physical mass storage devices (e.g., disks) or parts thereof into a single logical storage object, and which is managed as a single administrative unit, such as a single file system.

During the mount process, meta-data about each volume is retrieved from the disk subsystem. In some systems, the metadata that is accessed in a volume's mount path comprises many blocks, which may require many disk I/Os in order to mount the volume.

The takeover mode may be terminated when the partner storage server that has been experiencing failure is brought back on line. The storage server that was operating in a takeover mode may be requested (e.g., by a command issued by an administrator) to relinquish control over mass storage devices designated as serviceable by the other storage server partner. Such operation is known as a giveback operation. The other storage server partner then needs to mount all its volumes, which includes accessing on-disk metadata that is in each of its volume's mount path.

As the number of volumes that may be hosted by storage servers increases, the number of disk I/Os necessary for mounting the storage server's volumes also increases. Therefore, the time required to complete takeover and giveback operations in a clustered storage server system increases as the number of volumes increases for each partner storage server, because during takeover and giveback transitions a node has to mount the volumes of its partner.

SUMMARY

A system and method are provided for differential file based update for embedded systems. The system comprises a receiving component of a storage server to receive a partner server's file system metadata while the partner server operates in a normal mode. The partner server's file system metadata is stored in the storage server's metadata cache and is used to accelerate the mount of the partner server's file system when the first server transitions into a takeover mode of operation.

Other aspects of the invention will be apparent from the accompanying figures and from the detailed description that follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

As described in detail below, the technique introduced herein addresses performance issues associated takeover and giveback procedures. In one embodiment of the present invention, when two or more storage servers (nodes) operate as cluster partners, each node periodically pushes metadata associated with the node's volumes to other partners. "Pushing" in this context means that the metadata is sent to a recipient (e.g., a cluster partner) without the recipient having had to request the metadata. The metadata that is pushed for any given volume includes metadata that would be needed by a cluster partner to mount the volume. The specific nature of that metadata depends on the specific type of storage system being used in a given embodiment; such details are not necessary for an understanding of the technique being introduced here.

For example, in a configuration having two nodes, metadata associated with each file system of a node is pushed from the node to its partner during normal operation and is stored in the partner's memory. Conversely, metadata for the partner's file systems is pushed from the partner to the node during normal operation and is stored in the partner's memory. Thus, each cluster partner has the other's metadata, ready to be used during a takeover operation. When a node receives a request to transition to a takeover mode, e.g., in response to the partner's failure, at least some of the metadata needed to mount the partner's file systems (e.g., implemented as volumes) will already be available to the node in its own core memory, which may reduce the number of required disk access operations during the mounting of the file systems. When the node receives a request to transition to the normal mode from the takeover mode, e.g., in response to a giveback request when the partner is brought on line, the node may transfer the meta-data needed to mount the partner's file systems back to the partner. This approach may improve storage server performance associated with takeover and giveback procedures.

In one embodiment, the present invention may be implemented in the context of a storage-oriented network, e.g., a network that includes one or more storage servers that store and retrieve data on behalf of one or more clients. Such a network may be used, for example, to provide multiple users with access to shared data or to backup mission critical data. An example of such a network is illustrated in FIG. 1.

Figure 1:
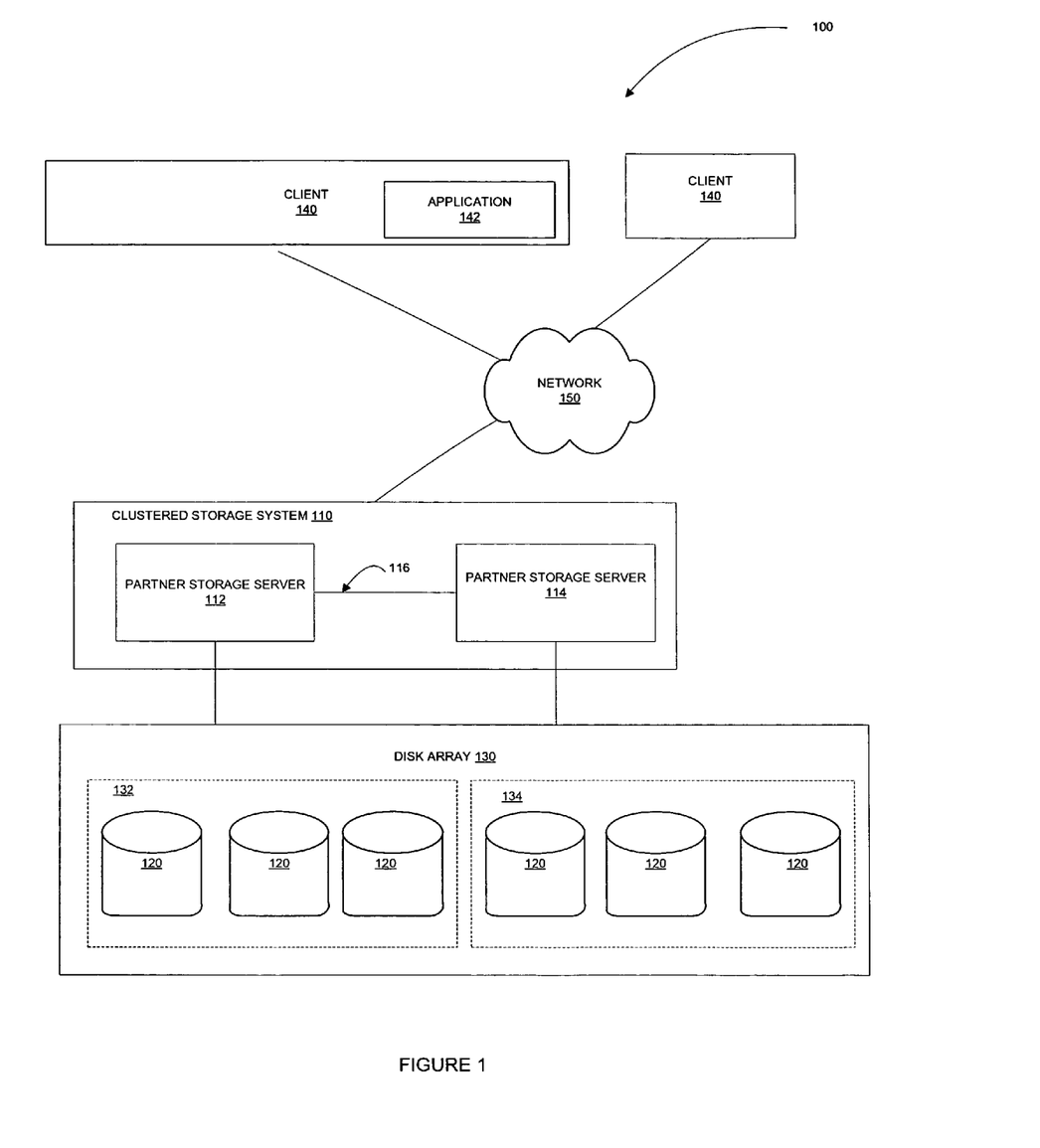
FIG. 1 is a schematic block diagram of an environment including a clustered storage system that may be used with one embodiment of the present invention.

FIG. 1 is a schematic block diagram of an environment 100 including a clustered storage system 110 that may be advantageously used with one embodiment of the present invention. The clustered storage system 110, in one embodiment, comprises partner servers (or nodes) 112 and 114 connected to each other via an interconnect 116 (the cluster interconnect).

Each of the partner server 112 and the partner server 114 may be configured to access information requested by clients 140 via a network 150. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on disks 120, such as HDD and/or DASD, of an array 130. When a failure or a fault occurs in the partner server 112, the partner server 112 may be rebooted or the partner server 114 may take over the responsibilities of the partner server 112 to continue managing those of the mass storage devices 120 that were previously managed by the partner server 112. In the latter case, the configuration of the system 110 may be referred to as clustered failover configuration (CFO). The CFO configuration supports takeover and giveback operations to transition the nodes from a normal mode of operation into a takeover mode of operation and vice versa.

In one embodiment, storage of information on array 130 may be implemented as one or more storage "volumes," such as a volume 132 and a volume 134, that comprise a collection of physical storage disks 120 cooperating to define an overall logical arrangement of (virtual block number) vbn space on the volumes. Each logical volume is generally, although not necessarily, associated with its own file system. The disks within a logical volume are typically organized as one or more groups, wherein each group may be operated as a RAID. Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it will be understood that other types and levels of RAID implementations may be used in accordance with the inventive principles described herein.

As noted above the clustered storage system 110 may service client requests over the computer network 150. The computer network 150 may comprise a point-to-point connection or a shared medium, such as a local area network. Illustratively, the computer network 150 may be embodied as an Ethernet network or a Fibre Channel (FC) network. The client 140 may communicate with the storage system over network 150 by exchanging discrete frames or packets of data according to pre-defined protocols, such as the Transmission Control Protocol/Internet Protocol (TCP/IP).

The client 140 may be a general-purpose computer configured to execute applications 142. Moreover, the client 140 may interact with the storage system 110 in accordance with a client/server model of information delivery. That is, the client may request the services of the storage system, and the system may return the results of the services requested by the client by exchanging packets over the network 150. The clients may issue packets including file-based access protocols, such as the Common Internet File System (CIFS) protocol or Network File System (NFS) protocol, over TCP/IP when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

It will be noted that any or all of the components of system 100 and associated hardware may be used in various embodiments of the present invention. However, other configurations of the networked data storage system may include more or fewer devices discussed above.

Figure 2:
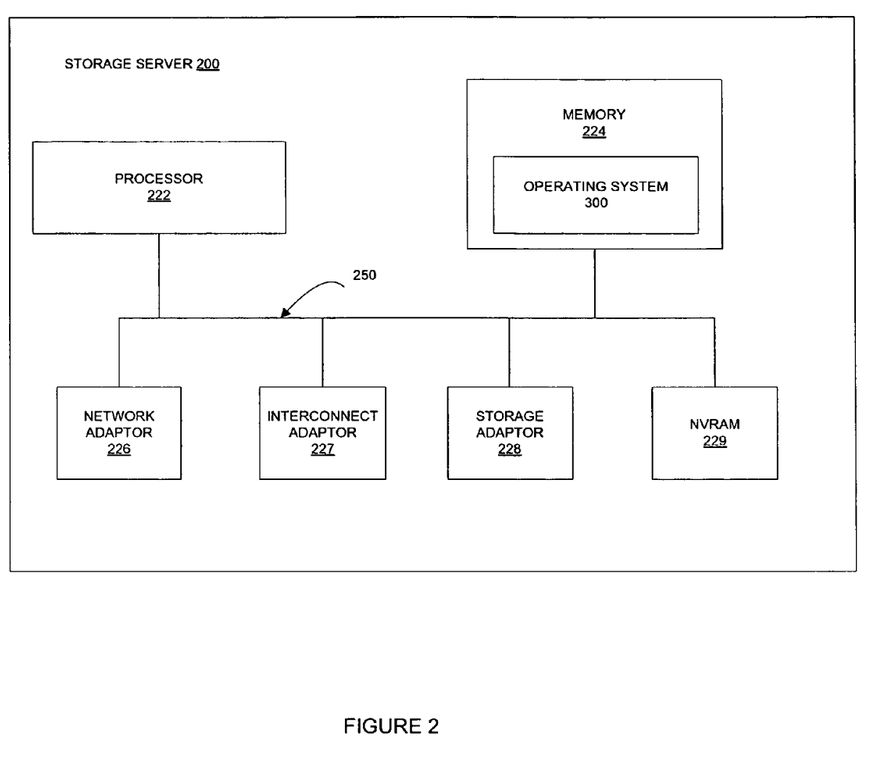
FIG. 2 is a schematic block diagram of a partner storage server that may be used with one embodiment of the present invention.

Additional details of one embodiment of a partner storage server are illustrated in FIG. 2. A storage system 200 comprises a processor 222, a memory 224, a network adaptor 226, and a storage adaptor 228, interconnected by a system bus 250.

In the illustrative embodiment, the memory 224 comprises storage locations that are addressable by the processor and adaptors for storing software program code. A storage operating system 300, portions of which are typically resident in memory and executed by the processing elements, functionally organizes the system 200 by, inter alia, invoking storage operations executed by the storage system. It will be apparent to those skilled in the art that other processing and memory means, including various computer readable media, may be used for storing and executing program instructions pertaining to the inventive technique described herein.

The network adaptor 226 comprises the mechanical, electrical and signaling circuitry needed to connect the storage system 200 to clients (e.g., the clients 140 of FIG. 10) over a computer network. The storage adaptor 228 cooperates with the storage operating system 300 executing on the system 200 to access information requested by a user (or client). The storage server 200 further includes the NVRAM 229, which may store a log of operations associated with transactions that have not yet been committed to disk.

As mentioned above, the storage server 200 may be incorporated into a storage system 110 of FIG. 1, adopting a cluster failover configuration (CFO). The interconnect adaptor 227 allows coupling of the storage server 200 to a partner storage server (a cluster partner) via the cluster interconnect 116 of FIG. 1. In one embodiment of the present invention, the interconnect adaptor 227 complies with the InfiniBand® Architecture Specification, Release 1.1, Nov. 6, 2002, to communicate with the cluster partner, and more specifically, to communicate with the cluster partner using remote direct memory access (RDMA) or InfiniBand® Send/Receive operations. InfiniBand is a trademark of the IBTA (InfiniBand Trade Association). In one illustrative embodiment, the interconnect adaptor 227 may be used by the partner servers to periodically push metadata associated with volumes to each other in the course of normal operation. When the cluster interconnect associated with the interconnect adaptor 227 is not operative (or down), the system behavior would revert to reading blocks from disk during mount operations associated with on takeover and giveback.

Figure 3:
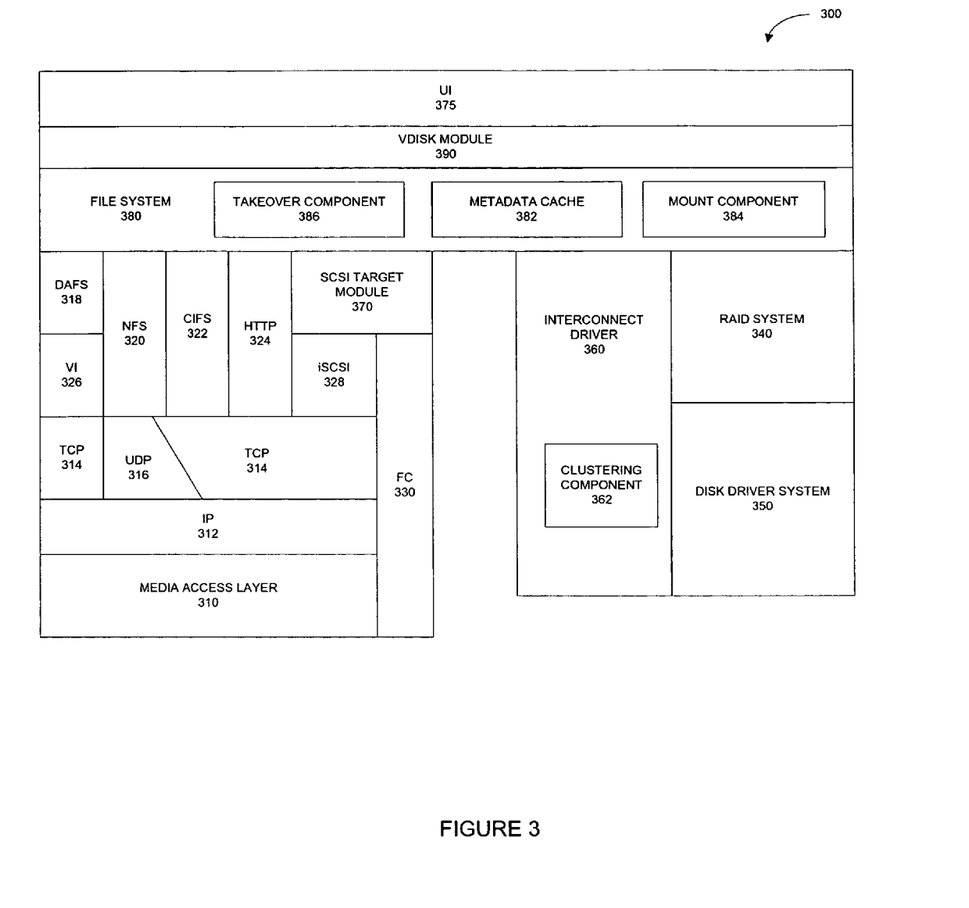
FIG. 3 is a schematic block diagram of a storage operating system that may be used with one embodiment of the present invention.

FIG. 3 illustrates the operating system 300 in greater details according to one embodiment of the invention. As used herein, the term "storage operating system" generally refers to the computer-executable code operable on a computer that manages data access and may implement file system semantics, such as the Data ONTAP™ storage operating system, implemented as a microkernel, and available from Network Appliance, Inc. of Sunnyvale, Calif., which implements a Write Anywhere File Layout (WAFL™) file system. The storage operating system can also be implemented as an application program operating over a general-purpose operating system, such as UNIX® or Windows NT®, or as a general-purpose operating system with configurable functionality, which is configured for storage applications.

FIG. 3 is a schematic block diagram of the storage operating system 300 that may be advantageously used with one embodiment of the present invention. The storage operating system comprises a series of software layers organized to form an integrated network protocol stack or, more generally, a multi-protocol engine that provides data paths for clients to access information stored on the storage system using block and file access protocols. The protocol stack includes a media access layer 310 of network drivers (e.g., gigabit Ethernet drivers) that interfaces to network protocol layers, such as the IP layer 312 and its supporting transport mechanisms, the TCP layer 314 and the User Datagram Protocol (UDP) layer 316. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A virtual interface (VI) layer 326 implements the VI architecture to provide direct access transport (DAT) capabilities, such as remote direct memory access (RDMA), as required by the DAFS protocol 318.

An iSCSI driver layer 328 provides block protocol access over the TCP/IP network protocol layers, while a FC driver layer 330 receives and transmits block access requests and responses to and from the storage system. The FC and iSCSI drivers provide FC-specific and iSCSI-specific access control to the blocks and, thus, manage exports of LUNs to either iSCSI or FCP or, alternatively, to both iSCSI and FCP when accessing the blocks on the storage system. In addition, the storage operating system includes a storage module embodied as a RAID system 340 that manages the storage and retrieval of information to and from the volumes/disks in accordance with I/O operations, and a disk driver system 350 that implements a disk access protocol such as, e.g., the SCSI protocol.

Bridging the disk software layers with the integrated network protocol stack layers is a virtualization system that is implemented by a file system 380 interacting with virtualization modules illustratively embodied as, e.g., vdisk module 390 and SCSI target module 370. The vdisk module 390 is layered on the file system 380 to enable access by administrative interfaces, such as a user interface (UI) 375, in response to a user (system administrator) issuing commands to the storage system. The SCSI target module 370 is disposed to provide a translation layer of the virtualization system between the block (LUN) space and the file system space, where LUNs are represented as blocks. The UI 375 is disposed over the storage operating system in a manner that enables administrative or user access to the various layers and systems.

The file system 380 is illustratively a message-based system that provides logical volume management capabilities for use in access to the information stored on the storage devices, such as disks. That is, in addition to providing file system semantics, the file system 380 provides functions normally associated with a volume manager. These functions include (i) aggregation of the disks, (ii) aggregation of storage bandwidth of the disks, and (iii) reliability guarantees, such as mirroring and/or parity (RAID). The file system 380 illustratively implements a write anywhere file system having an on-disk format representation that is block-based using, e.g., 4 kilobyte (kB) blocks and using index nodes ("inodes") to identify files and file attributes (such as creation time, access permissions, size and block location).

The file system 380, in one embodiment, includes components that may be utilized to improve server performance during takeover and giveback operations performed by cluster partners in the CFO configuration. In one embodiment, as mentioned above, a partner storage server may be configured to push metadata that is needed to mount the partner storage server's volumes.

In one embodiment, the file system 380 comprises a partner metadata cache 382 to store metadata for the cluster partner's volumes and a mount component 384 to access the metadata stored in the partner metadata cache 382 and use it to mount the volumes for the cluster partner during the takeover operation. While the storage server operates in the takeover mode, a takeover component 386 of the file system 380 may be configured to periodically update metadata for the cluster partner's volumes. Thus, when the cluster partner is ready to be brought back on line, the storage server may send metadata for the cluster partner's volumes to the cluster partner so that the cluster partner can mount its volumes without excessive disk I/Os.

The metadata stored in the partner metadata cache 382 comprises, in one embodiment, a set of blocks of metadata, for each volume of the cluster partner, that are accessed in the volume's mount path. The metadata that is necessary to mount a cluster partner's volumes is pushed by the cluster partners to each other during normal operation. Thus, each cluster partner has the other's metadata ready to be used during a takeover operation. In one embodiment, the metadata is pushed by a storage server to its cluster partner during a persistent consistency point, as described below.

The write-anywhere file system has the capability to generate a snapshot of its active file system. An "active file system" is a file system to which data can be both written and read or, more generally, an active store that responds to both read and write I/O operations. It should be noted that "snapshot" is a trademark of Network Appliance, Inc. and is used for purposes of this description to designate a persistent consistency point (CP) image. A persistent consistency point image (PCPI) is a space conservative, point-in-time read-only image of data accessible by name that provides a consistent image of that data (such as a storage system) at some previous time. More particularly, a PCPI is a point-in-time representation of a storage element, such as an active file system, file or database, stored on a storage device (e.g., on disk) or other persistent memory and having a name or other identifier that distinguishes it from other PCP's taken at other points in time. In the case of the WAFL file system, a PCPI is always an active file system image that contains complete information about the file system, including all metadata. A PCPI can also include other information (metadata) about the active file system at the particular point in time for which the image is taken. The terms "PCPI" and "snapshot" may be used interchangeably through out this patent without derogation of Network Appliance's trademark rights.

The write-anywhere file system supports multiple snapshots that are generally created on a regular schedule. Each snapshot refers to a copy of the file system that diverges from the active file system over time as the active file system is modified. In the case of the WAFL file system, the active file system diverges from the snapshots since the snapshots stay in place as the active file system is written to new disk locations. Each snapshot is a restorable version of the storage element (e.g., the active file system) created at a predetermined point in time and, as noted, is "read-only" accessible and "space-conservative". Space conservative denotes that common parts of the storage element in multiple snapshots share the same file system blocks. Only the differences among these various snapshots require extra storage blocks.

Returning to FIG. 3, the storage operating system 300 in one embodiment, includes an interconnect driver 360 to provide communications between the cluster partners (e.g., the partner storage servers 112 and 114 of FIG. 1). The interconnect driver 360, in one embodiment, comprises a clustering component 362 to handle transactions that are specific to storage servers cooperating in a CFO configuration. For example, a storage server may utilize the clustering component 362 to receive metadata from its cluster partner and to push metadata associated with its own volumes to the cluster partner.

Figure 4:
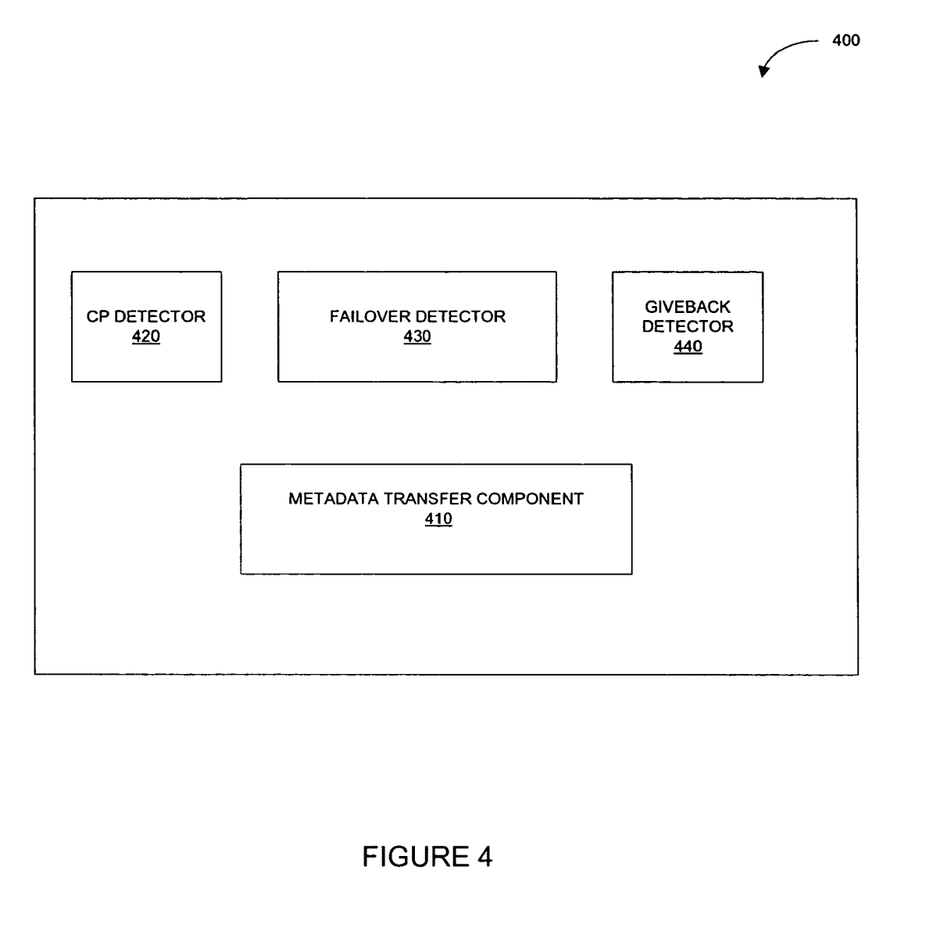
FIG. 4 is a schematic block diagram of a clustering component of an interconnect driver, according to one embodiment of the present invention.

FIG. 4 is a schematic block diagram of a clustering component 400, according to one embodiment of the present invention. The clustering component 400, may be implemented as part of an interconnect driver, such as the interconnect driver 360 illustrated in FIG. 3. The clustering component 400 may include a metadata transfer component 410 to receive a partner server's file system metadata and to push the storage server's file system metadata to the partner server. In one embodiment, as mentioned earlier, the storage server may be configured to push its file system metadata to the partner server each time a consistency point event is taking place. A CP detector 420 may be utilized to detect a consistency point event and to trigger the push operation. The clustering component 400 may further comprise a failover detector 430 to determine if the partner server is in a state that warrants a takeover operation by the storage server and a giveback component to determine if the giveback operation has been requested and to perform the giveback operation.

In an alternative embodiment, the metadata pushed by a node to its partner may comprise the block numbers of the blocks that are accessed in a mount path of the node's volumes. When the location of the blocks on disk that need to be read during the mounting of the partner's volumes are known to the processing logic, the disk I/Os may be ordered to construct one or more larger I/Os. Thus, the number of I/Os during the mount process would be reduced, thereby improving the storage server performance.

Figure 5:
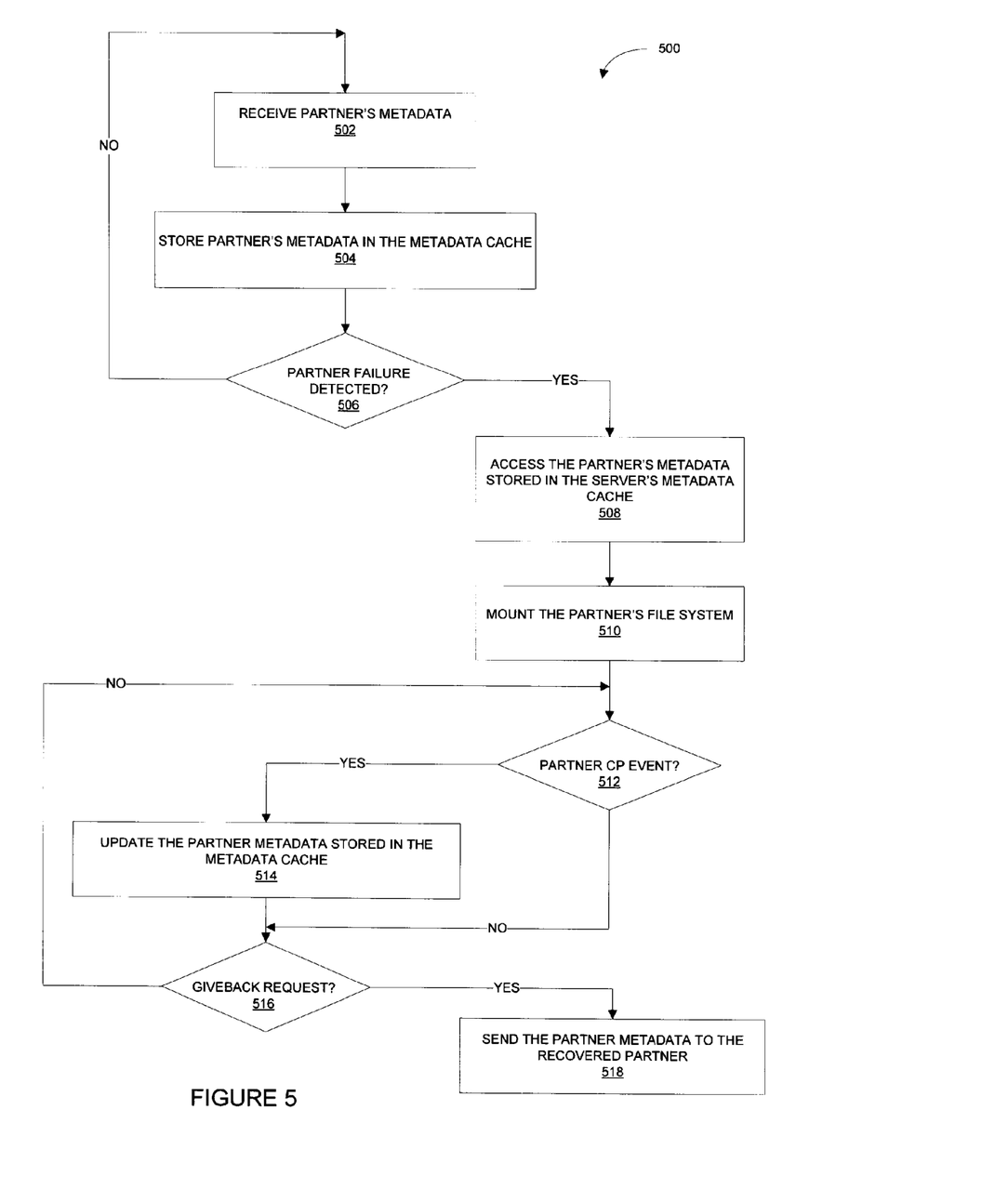
FIG. 5 is a flow chart illustrating a method to improve server performance associated with takeover and giveback procedures, according to embodiments of the invention.

FIG. 5 is a flowchart illustrating a method 500 to improve server performance associated with takeover and giveback procedures, according to one embodiment of the present invention. The process may be performed by processing logic that may comprise hardware (e.g., dedicated logic, programmable logic, microcode, etc.), software (such as run on a general purpose computer system or a dedicated machine), or a combination of both.

Referring to FIG. 5, the method 500 begins at operation 502 with processing logic receiving a partner server's metadata associated with blocks that are accessed in a mount path of a file system (here, a volume) of the partner server. The processing logic may receive either all of such blocks or just those blocks that are involved in a consistency point operation that triggered the partner server's sending the metadata. Alternatively, the metadata received from the partner may comprise the block numbers of the blocks that are accessed in a mount path of a volume of the partner server. At operation 504, the processing logic stores the received metadata in a metadata cache. The metadata cache may be implemented, in one embodiment, as part of the file system layer of the storage operating system (e.g., as shown in FIG. 3).

At operation 506, if a failure of the partner is detected by the processing logic, the processing logic may take over the responsibility of servicing requests directed to the partner storage server. The takeover operation, in one embodiment, comprises mounting the partner server's volumes. The mounting process, in one embodiment of the present invention, may be performed without accessing on-disk information for every item of metadata in the volume's mount path. Instead, the processing logic may utilize the metadata stored in the metadata cache (operation 508). At operation 510, the processing logic continues with mounting the partner's volumes utilizing metadata stored in the metadata cache. Note that, on a takeover, the metadata information stored in the metadata cache is valid (or non-stale). In one embodiment, this is because the data that is cached is the copy of what was written to disk during the most recent CP prior to the takeover operation. While the processing system operates in the takeover mode, i.e., the storage server provides to users functionality as if both partners are fully functional, the processing logic updates the metadata cache with the partner's volume metadata each time a CP event occurs for the partner (operations 512 and 514). Once the partner server is recovered from failure or is being brought back on line, the processing logic receives a giveback request (operation 516) and transfers the partner metadata stored in the metadata cache back to the partner server (operation 518). When the partner server receives the metadata, it can mount its volumes without excessive disk access operations.

Thus, a method and apparatus to improve server performance associated with takeover and giveback procedures have been described. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

Some portions of the foregoing detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description above. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; FLASH memory devices; electrical, optical, acoustical or other form of propagated signals (e.g., carrier waves, infrared signals, digital signals, etc.); etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A system to improve performance of a network storage system, the system comprising:
   a first server including a memory;
   a partner server coupled to the first server; and
   a mass storage device coupled to the first and partner servers, wherein the mass storage device is separate from the first server's memory and the first server comprises
      a receiving component to receive the partner server's file system metadata to mount the partner server's file system, wherein the metadata is received while the first server is operating in a normal mode,
      a metadata cache to store the partner server's file system metadata, wherein the metadata cache is maintained within the first server's memory, and
      a mount component to mount the partner server's file system utilizing the partner server's file system metadata stored in the metadata cache, without accessing the mass storage device for the metadata, to commence the first server operating in a takeover mode.

2. The system of claim 1, wherein the partner server's file system metadata comprises a set of blocks that are accessed in a mount path of the file system.

3. The system of claim 1, wherein the partner server's file system metadata comprises block numbers of a set of blocks that are accessed in a mount path of the file system.

4. The system of claim 1, further comprising a failover detector to detect a failure of the partner server, wherein the mount component is to mount the partner server's file system in response to the failover detector detecting the failure.

5. The system of claim 1, further comprising a takeover component to update the partner server's file system metadata stored in the metadata cache during the first server operating in the takeover mode.

6. The system of claim 5, further comprising a giveback component to:
   detect a giveback request; and
   transfer the updated partner server's file system metadata stored in the metadata cache to the partner server in order for the partner server to mount the partner server's file system.

7. The system of claim 1, further comprising a transfer component to push the first server's file system metadata during the first server operating in a normal mode.

8. The system of claim 7, further comprising a consistency point detector to detect a consistency point event at the first server, wherein the transfer component is to push the first server's file system metadata in response to the consistency point detector detecting the consistency point event.

9. The system of claim 7, wherein the first server's file system is from a plurality of file systems associated with the first server.

10. A method to improve performance of a network storage system, the method comprising:
    receiving a partner server's file system metadata to mount the partner server's file system, wherein the metadata is received while the first server is operating in a normal mode, wherein the first server includes a memory, wherein the first server and the partner server are coupled to a mass storage device, and wherein the mass storage device is separate from the first server's memory;
    storing the partner server's file system metadata in a metadata cache within the first server's memory, while the first server is operating in a normal mode; and
    mounting the partner server's file system utilizing the partner server's file system metadata stored in the metadata cache and without accessing a mass storage device coupled to the first server for the metadata.

11. The method of claim 10, wherein the partner server's file system metadata comprises a set of blocks that are accessed in a mount path of the file system.

12. The method of claim 10, wherein the partner server's file system metadata comprises block numbers of a set of blocks that are accessed in a mount path of the file system.

13. The method of claim 10, further comprising detecting a failure of the partner server, wherein the mount component is to mount the partner server's file system in response to the failover detector detecting the failure.

14. The method of claim 10, further comprising:
transitioning the first server to a takeover mode; and
updating the partner server's file system metadata stored in the metadata cache during the first server operating in the takeover mode.

15. The method of claim 14, further comprising:
detecting a giveback request; and
transferring the updated partner server's file system metadata stored in the metadata cache to the partner server.

16. The method of claim 10, further comprising pushing the first server's file system metadata during the first server operating in a normal mode.

17. The method of claim 16, wherein the pushing of the first server's file system metadata is in response to detecting a consistency point event for the first server.

18. The method of claim 16, wherein the first server's file system is from a plurality of file systems associated with the first server.

19. A first server to improve performance of a network storage system, the first server comprising:

a processor; and
a memory coupled with the processor and storing instructions which, when executed by the processor, cause the processor to
receive a partner server's file system metadata to mount the partner server's file system, wherein the metadata is received while the first server is operating in a normal mode, wherein the first server and partner server are coupled to a mass storage device, and wherein the mass storage device is separate from the first server's memory;
store the partner server's file system metadata in a metadata cache within the first server's memory, while the first server is operating in a normal mode; and
mount the partner server's file system utilizing the partner server's file system metadata stored in the metadata cache to commence the first server operating in a takeover mode and without accessing a mass storage device coupled to the first server for the metadata.

* * * * *